United States Patent [19]
Reeves

[11] Patent Number: 5,522,414
[45] Date of Patent: Jun. 4, 1996

[54] FLOW SENSOR

[75] Inventor: Gordon P. Reeves, Grandville, Mich.

[73] Assignee: G. P. Reeves, Inc., Grand Rapids, Mich.

[21] Appl. No.: 220,266

[22] Filed: Mar. 30, 1994

[51] Int. Cl.$^6$ .................................................. F16K 37/00
[52] U.S. Cl. .............................. 137/1; 137/554; 137/557; 137/315
[58] Field of Search .................................... 137/554, 557, 137/1, 315

[56] References Cited

U.S. PATENT DOCUMENTS

| | | |
|---|---|---|
| 2,550,093 | 4/1951 | Smith . |
| 3,247,798 | 4/1966 | Glasgow et al. . |
| 3,421,600 | 1/1969 | Gleason et al. . |
| 3,854,846 | 12/1974 | Douglas . |
| 3,888,420 | 6/1975 | Boelkins . |
| 3,918,843 | 11/1975 | Douglas et al. . |
| 3,921,666 | 11/1975 | Leiber ........................................ 137/557 |
| 3,926,279 | 12/1975 | Thrasher . |
| 4,207,931 | 6/1980 | Tomson et al. .............................. 141/1 |
| 4,324,316 | 4/1982 | Thrasher, Jr. et al. . |
| 4,459,458 | 7/1984 | Vetsch et al. ......................... 219/121 L |
| 4,507,053 | 3/1985 | Frizzell . |
| 4,858,645 | 8/1989 | Reeves . |
| 5,144,102 | 9/1992 | Buse ........................................... 137/557 |

FOREIGN PATENT DOCUMENTS

| | | |
|---|---|---|
| 2238799 | 2/1974 | Germany . |

OTHER PUBLICATIONS

Exhibit A is a product brochure entitled "Lubriquip—Centralized Lubrication Systems" published in Feb. of 1991 by Lubriquip, Inc. a Unit of IDEX Corporation, Cleveland, Ohio, 1993.

Exhibit B is a product brochure entitled "Flow Monitors" published by Chem–Tec Equipment Company, Deerfield Beach, Florida, 1993.

Exhibit C is a product brochure entitled "Balluff—Inductive Proximity Switch" published by Balluff Company, 1993.

Exhibit D is a product brochure on a "TS934A Dispensing Valve" published by Techcon Systems Inc., Carson, California, dated 1987.

*Primary Examiner*—A. Michael Chambers
*Attorney, Agent, or Firm*—Price, Heneveld, Cooper, DeWitt & Litton

[57] ABSTRACT

A fluid flow sensor is provided for use in a remote location from a fluid delivery system, such as a lubricant or grease delivery system for lubricating parts. The fluid flow sensor includes a body defining a lubricant conveying passageway having a seat, and a poppet configured to engage the seat. The poppet is biased against the seat by a spring, but is moveable off the seat when fluid is moved through the passageway. The poppet includes a rod that extends upstream from the poppet through an aperture in the passageway, and a piston is positioned abuttingly against the end of the rod and biased against the rod by a spring so that the piston will move with the poppet as the poppet is moved off the seat in a first direction. A proximity switch is positioned perpendicularly to the first direction adjacent the piston. The piston is adjustable along the first direction, and the proximity switch is adjustable in the perpendicular direction, such that the sensitivity and hysteresis of the sensing arrangement can be adjusted and set to desired levels. By this arrangement, fluid quantities of as little as 0.001 cubic inch can be accurately sensed at an actuation or cycle frequency of about 100 milliseconds.

33 Claims, 8 Drawing Sheets

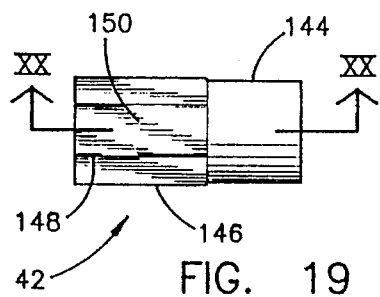
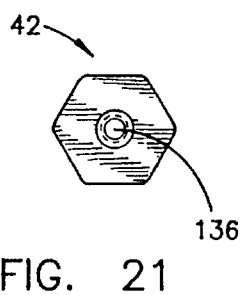 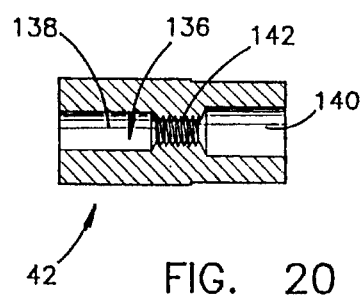 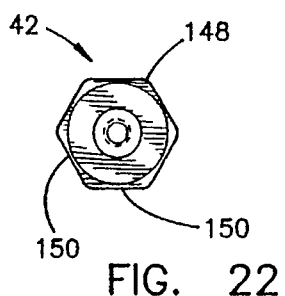
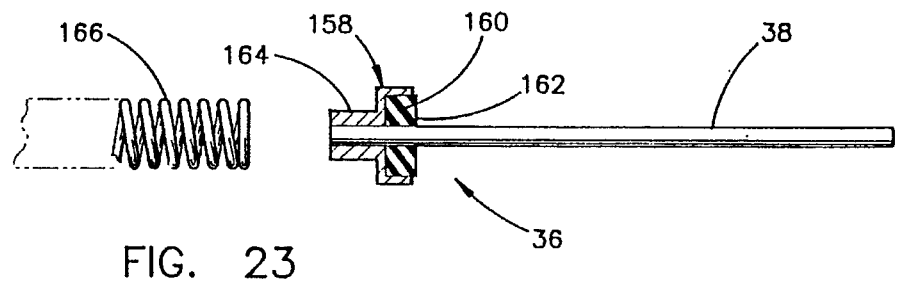

FLOW SENSOR

BACKGROUND OF THE INVENTION

This invention concerns flow sensors for sensing flow of fluids such as lubricants or grease, and more particularly concerns a device for sensing flow of quantities of volumetric metered lubricant in locations remote from the fluid delivery source, particularly where the quantities are small and must be delivered in rapid succession.

Reed switches are commonly used in flow sensors to detect movement of a flow sensitive member such as a piston. However, reed switches require relatively long movements of sixty thousandths of an inch or longer, which results in an undesirably slow response time and resultant slow cycle time. Also, the reed switches may be difficult and messy to replace, and fine adjustment of the reed switch is often not easily accomplished. Further, the pistons commonly used with reed switches in remote flow sensors include close tolerances, and may hang-up or bind on particles and contaminants in the fluids, lubricants or grease. Still further, as the remote flow sensors are adjusted for maximum sensitivity to deliver very small quantities of lubricant, known flow sensors often give false signals to the controller of the fluid delivery source, causing disruption of the product process or too much fluid to be delivered.

Therefore, a flow sensor solving the aforementioned problems is desired.

SUMMARY OF THE INVENTION

The present invention includes a device for detecting flow of a metered volumetric quantity of lubricant from a lubricant delivery system. The device includes a body defining a lubricant conveying passageway and a seat defined along the passageway. A poppet is located in the passageway, the poppet being configured to operably engage the seat so that the poppet is normally engaged with the seat but is temporarily disengaged when a quantity of lubricant is delivered from the lubricant delivery system through the passageway. The device further includes sensing means including a proximity switch operably mounted on the body for sensing movement of the poppet, the proximity switch being operably electrically connected to the lubricant delivery system so that movement of the poppet is signaled to the lubricant delivery system. In the preferred form, a rod extends from the poppet through an aperture in the passageway, and a piston is biased against the rod so that the piston moves with the poppet, the piston forming a target for the proximity switch. Also in some preferred forms, a component providing for restricted bypass of the lubricant around the poppet and also for suck-back of lubricant after closure of the poppet is added to optimize use in some applications.

These and other related objects, advantages and features of this invention will become apparent upon review of the following specification in conjunction with the drawings.

BRIEF DESCRIPTION OF THE DRAWINGS

FIGS. 19–22 are orthogonal views of the piston shown in FIG. 1, FIG. 20 being a cross-sectional view taken along the plane XX—XX in FIG. 19;

FIG. 23 is a side cross-sectional view of the poppet;

FIG. 26 is a side cross-sectional view of a third flow sensor including a component providing for lubricant bypass around the poppet and for suck-back of the lubricant.

DETAILED DESCRIPTION OF PREFERRED EMBODIMENT

Figure 1:
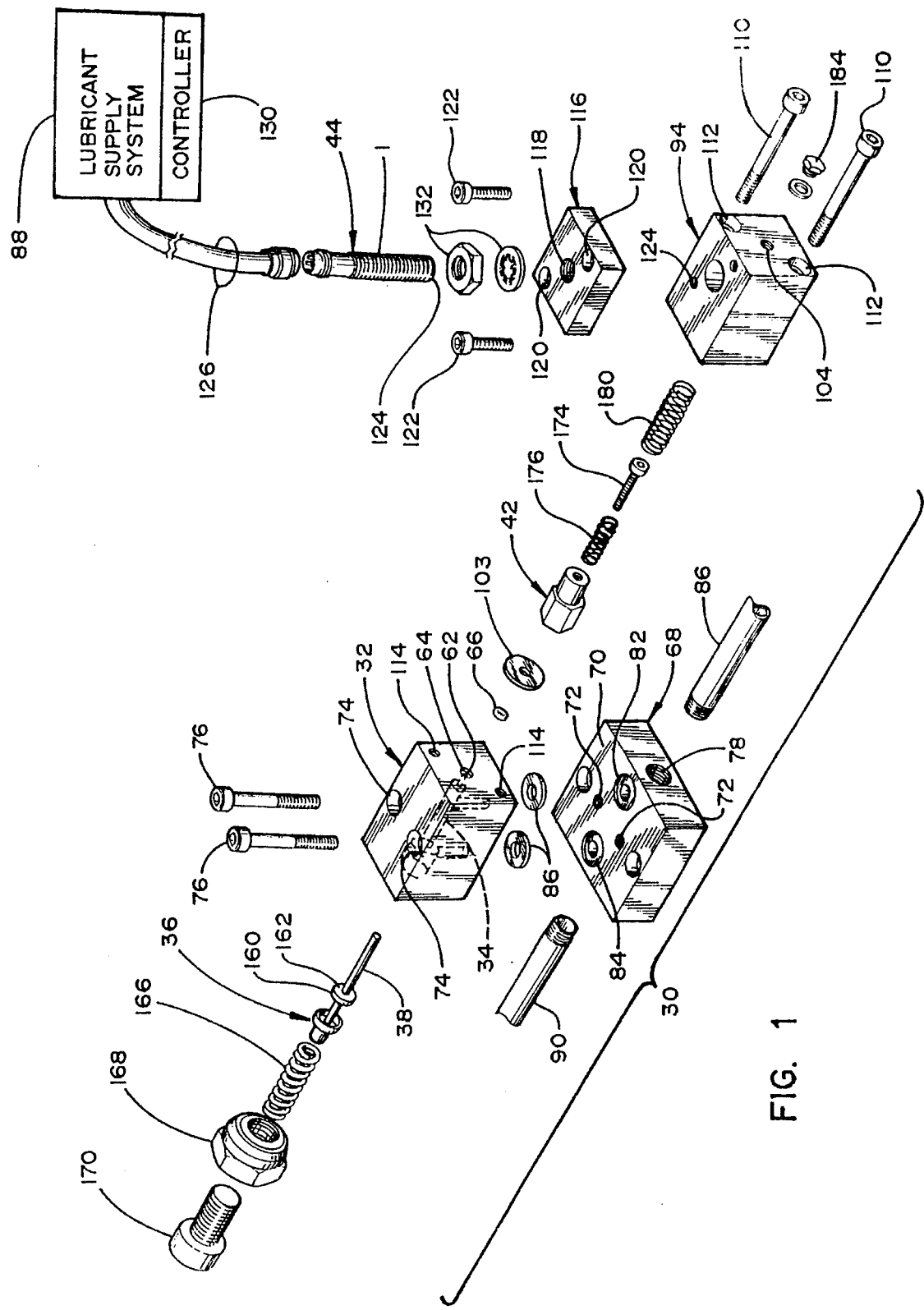
FIG. 1 is an exploded perspective view of a flow sensor according to the present invention.

A fluid flow sensor 30 (FIG. 1) embodying the present invention includes a flow sensor body 32 defining a lubricant conveying passageway 34, and a poppet or check body 36 operably positioned in the passageway 34. The poppet 36 includes a rod 38 that extends upstream in the passageway 34 and further extends out of passageway 34 through an aperture 62 in the side of passageway 34. A piston 42 is positioned against the end of rod 38 so that it moves with the poppet 36, and a proximity switch 44 is positioned perpendicularly to piston 42 so that proximity switch 44 can sense the movement of piston 42. The location of proximity switch 44 can be adjusted laterally relative to piston 42 and piston 42 can be adjusted longitudinally relative to poppet 36 such that the hysteresis of actuation/de-actuation and responsiveness of sensor 30 can be preset as desired. In particular, testing has shown that flow sensor 30 is capable of sensing fluid quantity deliveries in the range of about 0.001 cubic inches and is capable of being actuated at a cycle frequency of about 100 milliseconds with as little as 0.003 to 0.004 inches movement of poppet 36. At the same time, the piston 42 is not subject to contaminants in the fluid passing through passageway 34 because piston 42 is not positioned in the fluid. Further, poppet 36 does not require the tight tolerances that a piston requires, and thus poppet 36 is less sensitive to contaminants in the fluid being delivered.

More particularly, fluid sensor body 32 (FIGS. 1 and 5–9) is a rectangular block of metal having a top surface 32A, a bottom surface 32B, a front surface 32C, a rear surface 32D and side surfaces 32E. Notably, the references to "top," "bottom," "front," "rear" and the like are used to facilitate describing the sensor 30 as shown in FIG. 1, however it is noted that sensor 30 can be used in different orientations and that these terms are not intended to be unnecessarily limiting. Lubricant passageway 34 is U-shaped and includes an inlet section 50, a poppet receiving straight section 52, and an outlet section 54. A front hole 56 is drilled into front surface 32C and partially into passageway straight section 52, thus forming a seat 58 in straight section 52. A channel 59 communicates fluid from passageway straight section 52 to outlet section 54 around poppet 36 when poppet 36 is unseated from seat 58. Front hole 56 includes threads 60 up to about the point at which, front hole 56 enters passageway 34. A rod receiving rear hole 62 extends from rear surface 32D into straight section 52 in line with straight section 52. A depression 64 is formed in rear surface 3213 around rear hole 62 for receiving all "O"-ring 66 (FIG. 1).

A manifold or base 68 (FIG. 1) is a rectangular block of metal configured for attachment to bottom surface 32 of flow sensor body 32. Base 68 includes a sensor-body-engaging side 70, and a pair of threaded attachment holes 72 that extend into side 70. A corresponding pair of attachment holes 74 extend through flow sensor body 32 for receiving attachment screws 76 to secure body 32 to base 70. Base 68 includes a lubricant passageway 78 (FIG. 2) configured to align with passageway inlet section 50 on body 32, and further includes a lubricant outlet passageway 80 configured to align with passageway outlet section 54 in body 32. "O"-ring receiving depressions 82 and 84 (FIG. 1) are located on the sensor body engaging side 70 at inlet 78 and outlet 80, respectively. "O"-rings 86 are positioned in depressions 82 and 84 to prevent leakage of lubricant between body 32 and base 68. Inlet passageway 78 is connected to a lubricant supply line 86 that extends from a lubricant supply system 88, and outlet passageway 80 is connected to a lubricant dispensing line 90.

An adjustment body 94 (FIGS. 1 and 12–16) is a rectangular block of aluminum having a top surface 94A, a bottom surface 94B, a front surface 94C, a rear surface 94D and side surfaces 94E. A multi diameter hole 96 extends from front surface 94C to rear surface 94D. Multi diameter hole 96 includes a piston receiving main section 98, and a bias spring receiving section 100 that is located on the poppet remote side of main section 98. A washer-shaped depression 102 for holding a washer 103 (FIG. 1) against "O"-ring 66 is formed on front surface 94C at the front end of main section 98. A threaded access hole 104 extends from second section 100 to rear surface 94D. A proximity-sensor-receiving hole 106 extends from top surface 94A into the juncture of main section 98 and second section 100 of multi diameter hole 96, hole 106 being perpendicular to hole 96. A second perpendicular hole 108 extends from bottom surface 94B into main section 98. Second perpendicular hole 108 intersects main section 98 in a location spaced from front surface 94C, but in the front half of main section 98. Adjuster body 94 is connected to flow sensor body 32 by a pair of screws 110 (FIG. 1) that extend through holes 112 in body 94 and threadably into holes 114 in flow sensor body 32.

Figure 2:
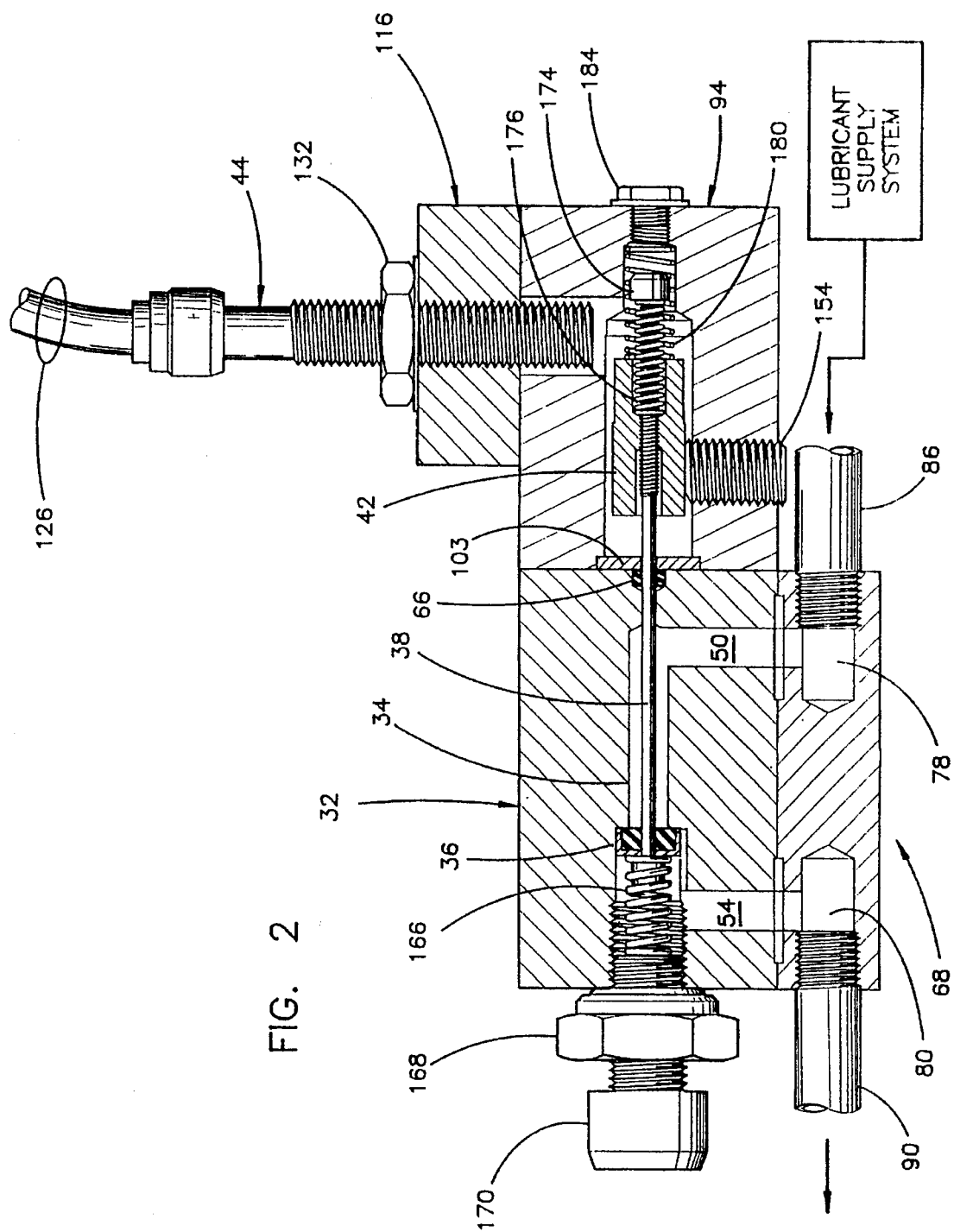
FIG. 2 is a cross-sectional elevational view of the flow sensor shown in FIG. 1, the poppet being shown in the closed position.
Figure 3:
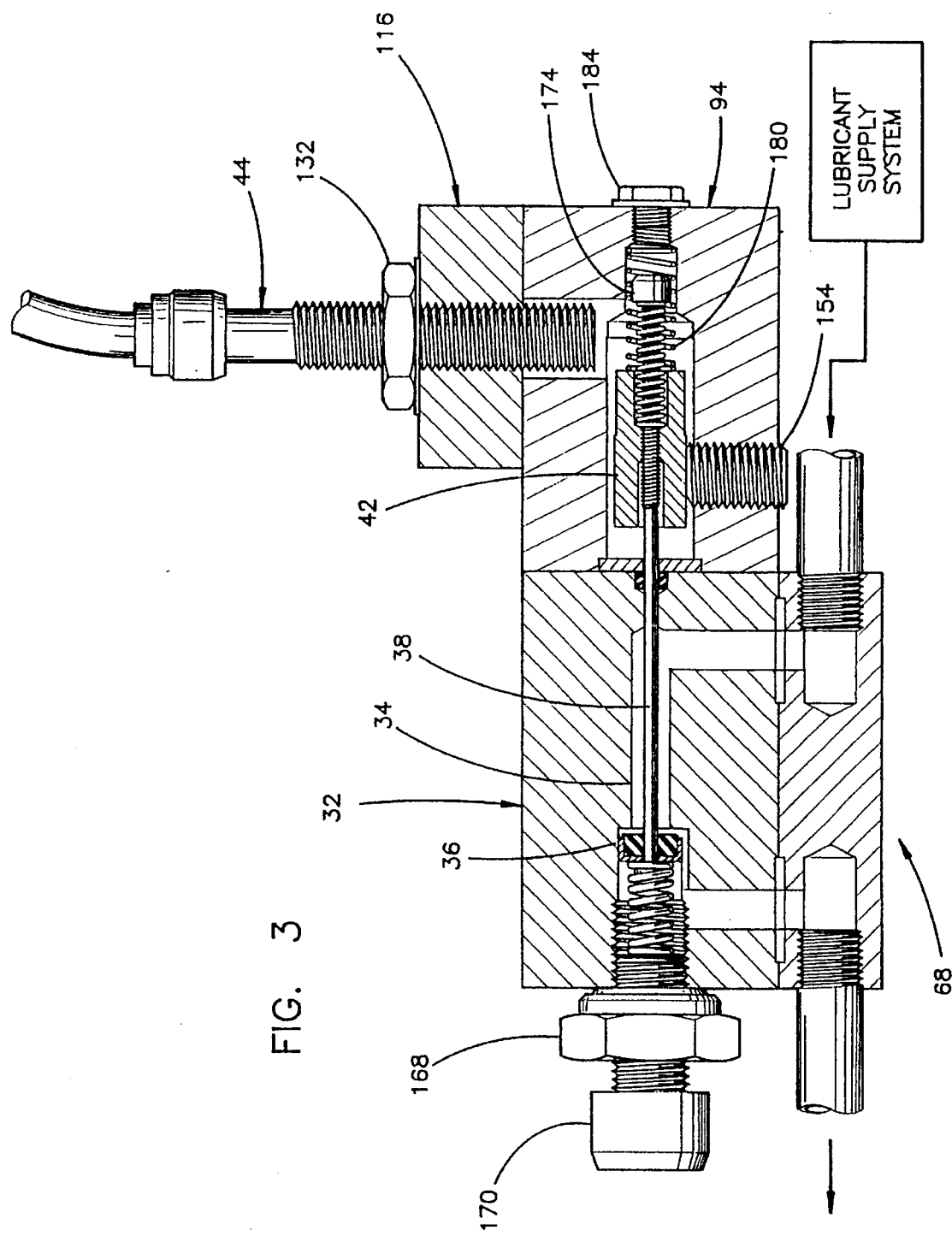
FIG. 3 is a cross-sectional elevational view identical to the view in FIG. 2 except with the poppet shown in the open position.
Figure 17:
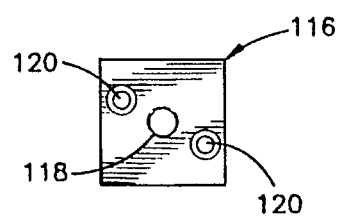
FIGS. 17–18 are orthogonal views of the proximity switch adapter.
Figure 18:
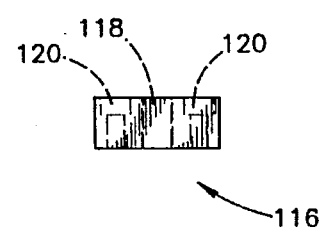

A proximity switch adapter 116 (FIGS. 1 and 17–18) is a rectangular block of aluminum having a threaded hole 118 for receiving proximity switch 44, and a pair of attachment holes 120. Screws 122 (FIG. 1) are extended through attachment holes 120 into threaded holes 124 in adjustment body 94 to secure adapter 116 to adjustment body 94. Proximity switch 44 is rod-shaped and includes a threaded exterior 122. A leading end 124 of proximity switch 44 includes an inductive sensing end for sensing a metal target, and wires 126 extend from the opposite end 128 for communicating a signal from proximity switch 44 when the sensing end is actuated. Wires 126 are operably connected to a controller 130 on lubricant supply system 88. Proximity switch 44 is threaded into threaded hole 118 so that the leading end 124 extends into hole 106 in adjustment body 94 and is positioned a desired distance from piston 42 (FIGS. 2–3). Proximity switch 44 is locked in place by a lock washer and nut 132 that threads onto proximity switch 44 and locks against proximity switch adapter 116. It is noted that a proximity switch such as a PNP proximity switch model BES-516-324-E5-D-S49 by Balluff Company will work satisfactorily in this application.

Piston 42 (FIGS. 1 and 19–22) is a rod-shaped member having a maximum diameter for slideably engaging the piston receiving main section (98) of multi diameter hole (96) in adjustment body 94. A bore 136 (FIG. 20) extends longitudinally through piston 42 from end-to-end. Bore 136 includes a rod receiving section 138 located at a front end of piston 42, a spring receiving section 140 located at a rear end of piston 42, and a threaded section 142 connecting sections 138 and 140. The exterior surface of piston 42 includes a cylindrically-shaped portion 144 forming a target for proximity switch 44, and a hex-shaped portion 146. Hex-shaped portion includes six corners 148 that are rounded for slideably engaging main section (98) of hole (96) of adjustment body (94). Hex-shaped portion 146 includes six flat surfaces 150, one of which faces downwardly. A stud 154 (FIG. 2) is extended through second perpendicular hole 108 in adjustment body 94. Stud 154 includes a piston engaging end that projects into main section 98 and slideably engages the downwardly facing flat surface 150 on piston 42 to prevent piston 42 from rotating.

Popper 36 (FIGS. 1 and 23) includes a body or disk 158. Rod 38 is fixed to disk 158 and extends perpendicularly therefrom. A polymeric seat forming member 160 is located in disk 158 on the rod extending side of disk 158. Seat forming member 160 defines a seat engaging surface 162 for engaging seat 58. A protrusion 164 extends from disk 158 in an opposite direction from rod 138. Protrusion 164 defines with disk 158 an exterior surface for mateably receiving poppet biasing spring 166. A threaded sleeve 168 (FIG. 1) is threaded into front hole 56 in flow sensor body 32, and an adjustment screw 170 is threaded into sleeve 168. Adjustment screw 170 engages and compresses poppet biasing spring 166 and thus biases poppet 44 against seat 58.

Piston 42 (FIG. 2) is positioned in main section 98 of hole 96 of adjustment body 94. A piston adjustment screw 174 (FIG. 1) is threaded into threaded hole (142) in the center of piston 42. The end of piston adjustment screw 174 engages the end of rod 38 and sets the relative distance between poppet 44 and piston 42. A locking spring 176 is located on adjustment screw 174 and is compressed between the head of piston adjustment screw 174 and the side of threaded hole 142. In other words, locking spring 176 is compressively located partially within spring receiving section 140 of piston 42. This causes piston adjustment screw 174 to be frictionally held in its preset adjusted position. A piston biasing spring 180 is located in rod receiving section 138 of bore 136 in piston 42. Piston engaging spring 180 is compressed within biased-spring-receiving second section 100 against piston 42. This biases piston 42 against poppet 36. Piston adjustment screw 174 can be accessed through hole 104 in adjustment body 94. A plug screw 184 plugs access hole 104 to prevent dirt and debris from entering hole 104.

Having described the components and interrelationships of flow sensor 30, the operation and advantages of the present invention will become apparent to a person of ordinary skill in this art. In operation, piston 42 (FIG. 2) is initially adjusted longitudinally with respect to poppet 36 by turning piston adjustment screw 174, and proximity switch 44 is adjusted relative to piston 42 laterally by rotating proximity switch 44 threadably on proximity switch adapter 116. Notably, proximity switch adapter 116 can be rotated 180°, and hole 118 in proximity switch adapter 116 is located slightly offset from a line connecting attachment holes 122 such that by rotating proximity switch adapter 116 an angle of 180°, the location of proximity switch 44 can be moved slightly without loosening and later retightening proximity switch 44 on adapter 116. By adjusting proximity switch 44, the hysteresis and actuation/de-actuation points of proximity switch 44 relative to movement of poppet 36 (and piston 42) can be set to a predetermined level and sensitivity.

Figure 4:
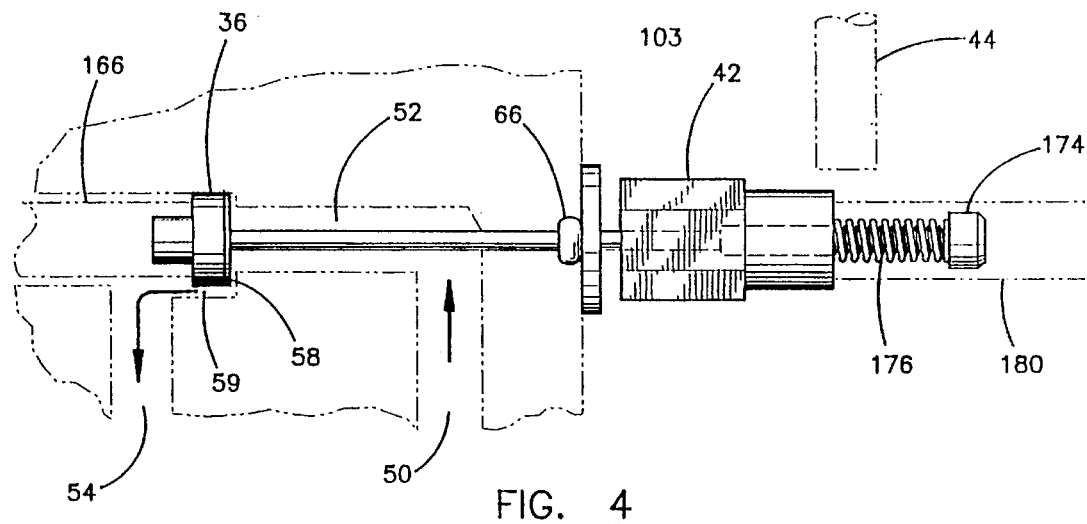
FIG. 4 is a schematic side view of the poppet and the piston shown in FIG. 3.
Figure 5:
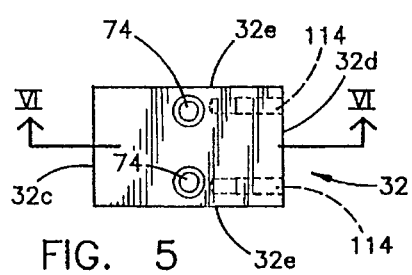
FIGS. 5–9 are orthogonal views of the flow sensor body, FIG. 6 being a side cross-sectional view taken along the plane VI—VI in FIG. 5.
Figure 7:
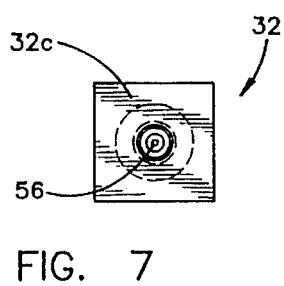
Figure 6:
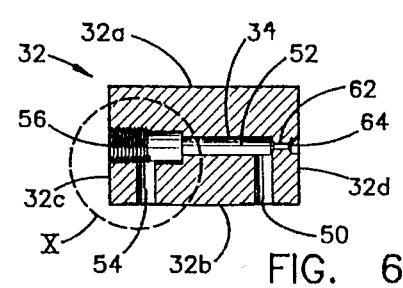
Figure 8:
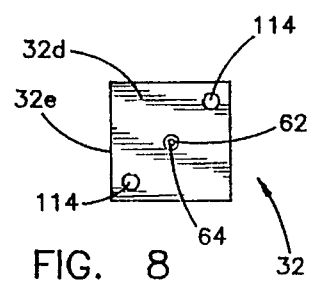
Figure 11:
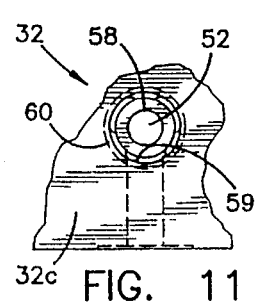
FIG. 11 is an end view of the hole shown in FIG. 10.
Figure 9:
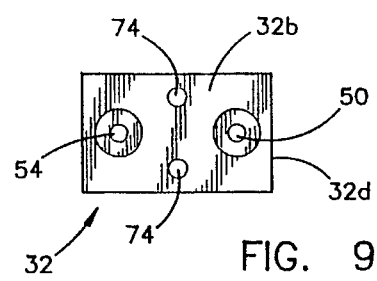
Figure 10:
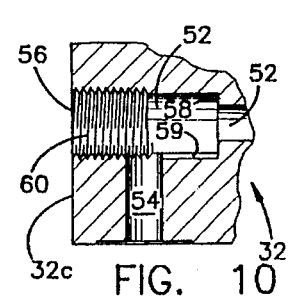
FIG. 10 is an enlarged view of the circled area labelled X in FIG. 6.
Figure 12:
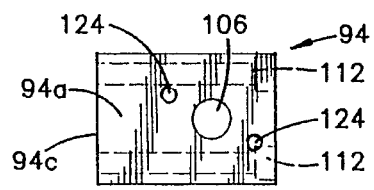
FIGS. 12–16 are orthogonal views of the piston receiving adjustment body shown in FIG. 1.
Figure 13:
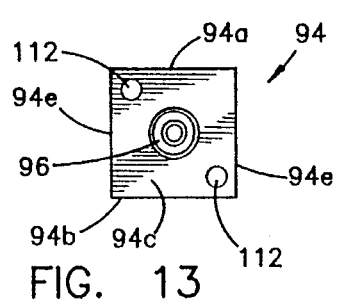
Figure 14:
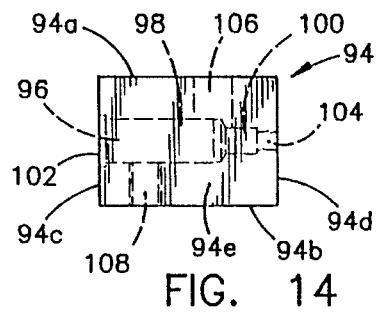
Figure 15:
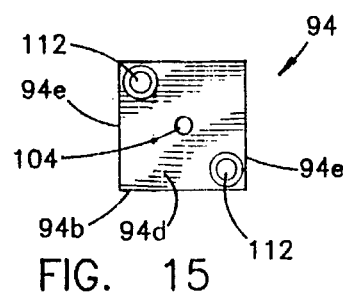
Figure 16:
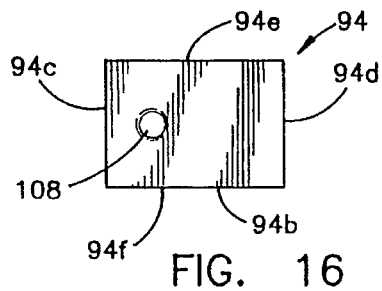

As lubricant supply system 88 delivers lubricant to passageway 34, poppet 36 is disengaged from seat 58 (FIGS. 3–4). In turn, piston bias spring 180 moves piston 42 along with poppet 44. Thus, the target portion 144 of piston 42 is moved away from proximity switch 44, and proximity switch 44 is de-actuated. As lubricant flow is discontinued within passageway 34, poppet bias spring 170 overcomes piston bias spring 180 to reseat poppet 44 on seat 58 and move piston 42 against piston bias spring 180 and poppet 36 thus reseats on seat 58 (FIG. 2). The reseating of poppet 36 causes piston 42 to be moved to a position where proximity switch 44 is re-actuated. Thus, proximity switch 44 sends another signal to a controller 88A on lubricant supply system 88 signifying that the cycle has been completed.

Notably, poppet 36 is relatively insensitive to contaminants or particles that may be in the lubricant flowing through passageway 34 due to the clearances provided around poppet 36. Further, piston 42 is positioned in a location where it does not encounter the lubricant and for this reason piston 42 is also not sensitive to the contaminants and particles within the lubricant. Still further, the longitudinal and lateral relative location of proximity switch 44 relative to its target (i.e. piston 42) and poppet 36 is infinitely adjustable and easily adjustable. Also, the adjustment of proximity switch 44 is relatively easily accomplished without disassembling flow sensor 30. Testing has shown that with the flow sensor disclosed herein, proximity switch 44 is capable of providing a very sensitive and reliable signal, such that the flow sensor 30 is capable of 100 millisecond cycle times with about 0.001 cubic inches of lubricant per actuation. It is contemplated that flow sensor 30 will be used with NLGI2 grease, for example, although it is contemplated that flow sensor 30 can be successfully used with lubricants and other fluid materials.

A modification is contemplated wherein a proximity switch (44) would be threadably extended into a threaded hole (104) aligned with piston (36). In such case, the proximity switch would be aligned longitudinally with the movement of piston (42), and the leading end (124) of the proximity switch would be positioned adjacent piston (42). The operation and actuation/de-actuation of this modification would be generally similar to the arrangement described above.

MODIFICATIONS PERMITTING BYPASS AND SUCK-BACK

Flow sensor 230 (FIG. 24), flow sensor 330 (FIG. 25) and flow sensor 430 (FIG. 26) incorporate the components of sensor 30 except that flow sensor body 32 is modified as discussed below. Also, one or more components are added to allow restricted and/or controlled bypass of fluid/lubricant/ grease around the poppet 36. Thus, sensors 230, 330 and 430 can be set so they will only be actuated if a predetermined level of flow is exceeded. Further, sensors 230, 330 and 430 are modified to provide "snuff-back" or suck-back of lubricant, which is often desired when intermittently delivering lubricant to prevent drool or undesired depositing of lubricant between cycles.

In sensor 230 (FIG. 24), flow sensor body 32 is modified to include a first bypass passageway 232 and a second bypass passageway 234. Passageways 232 and 234 extend from top surface 32A to poppet receiving straight section 52, one being on each side of poppet 36. A ring-shaped depression is formed in top surface 32A at each opening to passageways 232 and 234 for receiving "O"-rings 233 and 235. A bypass body 236 is a rectangular metal block including top surface 236A, a bottom surface 236B which engages top surface 32A of fluid sensor body 32, a front surface 236C, a rear surface 236D and side surfaces (not specifically shown). An "A"-shaped bypass passageway 238 is formed in bypass body 236. Bypass passageway 238 includes an inlet section 240 extending from bottom surface 236B for connecting to first passageway 232, and an outlet section 242 extending from bottom surface 236B for connecting to second passageway 234. Bypass passageway 238 further includes a check-valve-receiving upper section 244 connecting inlet and outlet sections 240 and 242, and a needle-valve-receiving lower section 246 connecting inlet and outlet sections 240 and 242.

Upper section 244 of bypass passageway 238 includes a check valve 248 comprising a seat 250, and a ball 252 positioned in upper section 244 for movement against seat 250. A bias spring 254 biases ball 252 against seat 250 to prevent flow of lubricant from inlet section 240 to outlet section 242. However, fluid flow during "suck-back" from outlet section 242 toward inlet section 240 is permitted once the bias force of spring 254 is overcome and ball 252 is unseated from seat 250. The access hole for inserting ball 252 and spring 254 extends perpendicularly from rear surface 236D into upper section 244, and is plugged by a threaded screw 258 which compressively engages spring 254 and sets the bias force of spring 254.

Lower section 246 of bypass passageway 238 includes an angled seat 260. An access hole 262 is bored from front surface 236C into lower section 246. A threaded adjustment rod 264 extends into hole 262 and includes an end section forming a needle valve 265 including a tip 266 5positioned proximate seat 260. Threaded adjustment rod 264 threadably engages access hole 262 at location 268 so that tip 266 creates the desired resistance to fluid flow at seat 260. A seal 270 is positioned on threaded adjustment rod 264 to prevent leakage of fluid, and a locking nut 272 is also positioned on threaded adjustment rod 264 for engaging front surface 236C to prevent undesired movement of rod 266. It is noted that different locking arrangements can be used in place of locking nut 272, such as a manually rotatable adjustment locking nut (such as is shown in FIG. 26) that includes friction generating detents for holding the nut in a given position when released but which facilitates easy adjustment.

Figure 24:
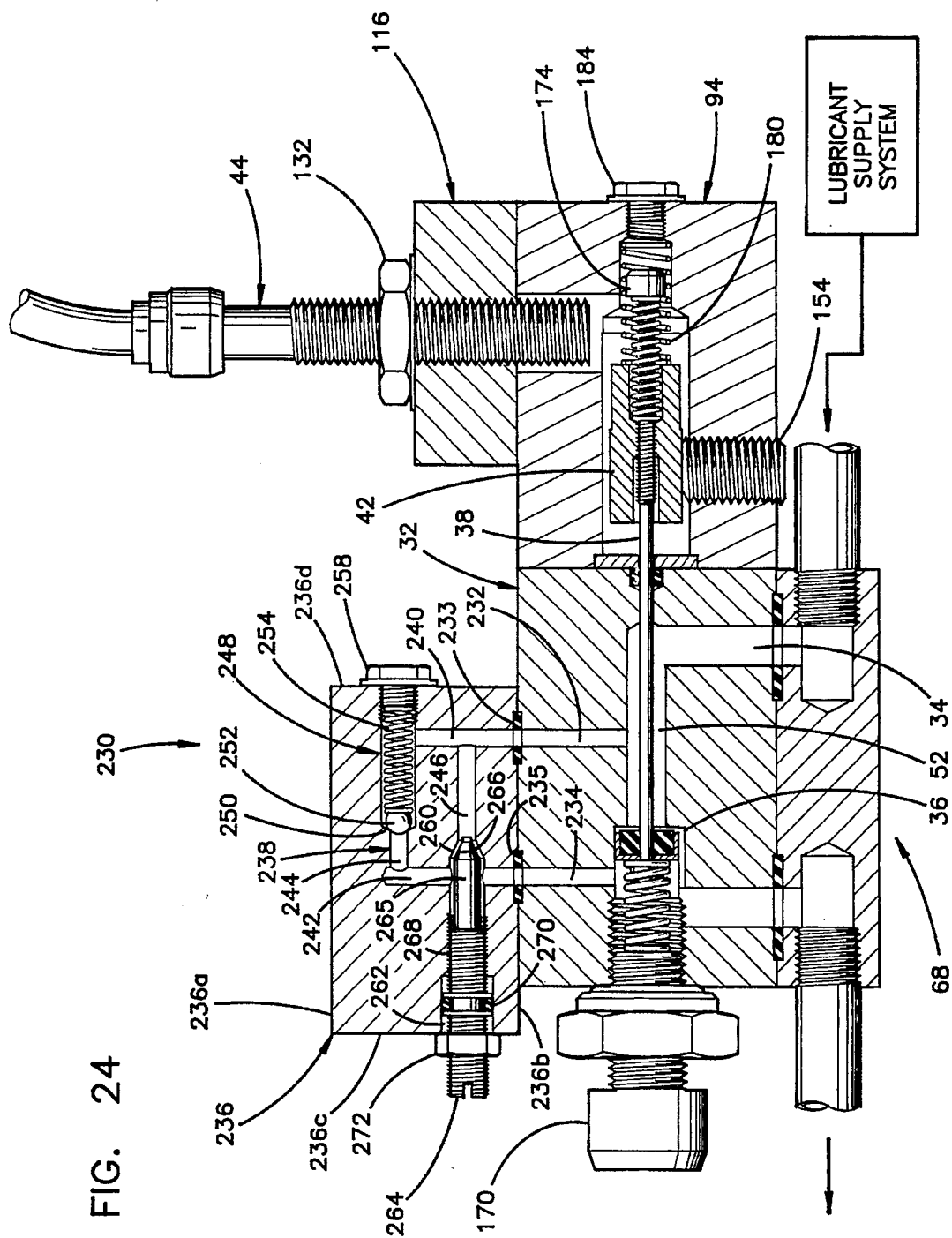
FIG. 24 is a side cross-sectional view of a modified flow sensor including a component providing for lubricant bypass around the poppet and for suck-back of the lubricant.
Figure 25:
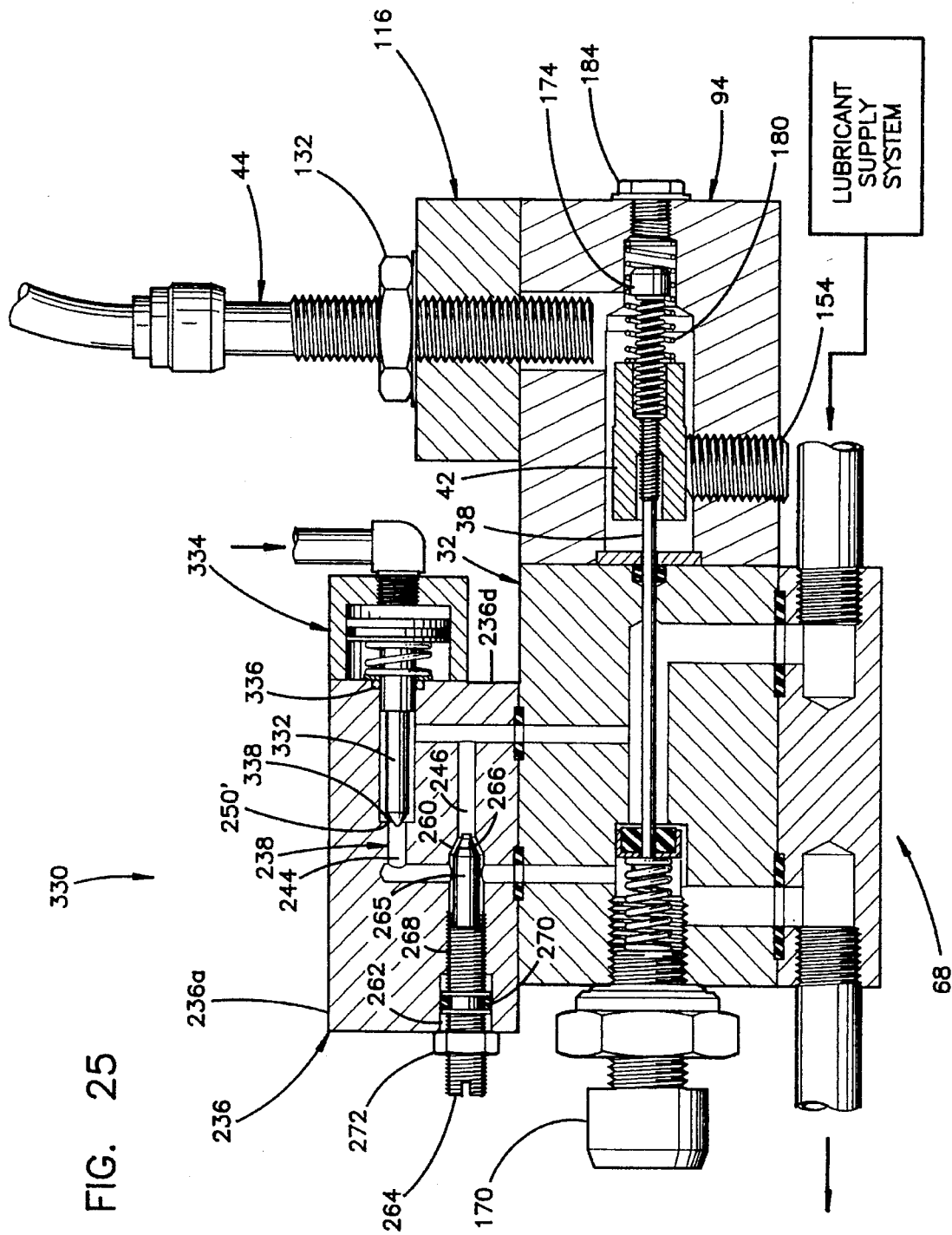
FIG. 25 is a side cross-sectional view of a second flow sensor including a component providing for lubricant bypass around the poppet and for suck-back of the lubricant.

FIG. 24, needle valve 265 is shown adjusted to an open position that is open enough to allow some of the lubricant to flow through bypass passageway 238 and thus flow around the poppet 36 of flow sensor 230. As the total fluid flow decreases, enough of the lubricant flow will bypass poppet 36 to allow the poppet to close, thus causing an indication of no flow. The flow sensor 230 can be calibrated for switching points at various flow rates by adjusting the needle valve 264. With the needle valve 264 open, more total flow will be necessary so that some of the flow will move through the poppet 36 to cause an indication of flow. With the needle valve 264 closed, less flow will be required to cause an indication of flow. The check valve 248 is installed to have a parallel flow path with the restriction 260/266. Check valve 248 allows lubricant flow only in the direction opposite of the normal flow of the flow sensor. This will allow the flow sensor 230 to accommodate an "unrestricted" reverse flow. Specifically, a suck-back-type dispensing valve (not shown) would be connected to the input side of sensor 230, and the material dispenser (not shown) would be connected to the output side of sensor 230. Suck-back dispensing valves are designed so that the downstream volume of lubricant is reduced after the lubricant flow is shut off, causing the lubricant being dispensed from a nozzle or tube to pull back into the dispenser drop point nozzle or tube. Suck-back would not be possible without this check valve because sensor poppet 36 closes when flow ceases. It is noted that it is possible to use only one of check valve 248 and restriction 260/266 in a given flow sensor valve, even though the embodiment shown includes both.

Flow sensor 330 (FIG. 25) includes a modified flow sensor body 32 and bypass body 236 as were previously described in regard to flow sensor 230, except that the seat 250' in the upper section 244 of bypass passageway 238 is modified to sealingly receive a plunger 332. A pilot operated valve 334 is mounted on the rear surface 236D and operably connected to plunger 332 for selectively controlling the movement of plunger 332. A seal 336 on plunger 332 prevents leakage of lubricant into valve 334. By actuating valve 334 and unseating plunger 332 at the time of suck-back or immediately prior thereto, plunger 332 opens up a cavity 338 adjacent seat 250' that creates an amount of suck-back by itself. It is noted that the present invention is contemplated to include a variety of different valves 334, including hydraulic, pneumatic, electric and other types of actuating mechanisms. The design of the normally open valve 330 contributes to the suck-back by reducing the downstream volume of lubricant material during the suck-back cycle and "increasing" it during the dispense cycle. Thus, flow sensor 330 also makes it possible to create some suck-back without using a separate suck-back-type dispense valve.

Flow sensor 430 (FIG. 26) includes a modified flow sensor body 32 and a bypass body 236 as were previously described, except that upper section 244 of bypass passageway 238 is eliminated. Further, threaded adjustment rod 264 is replaced with an adjustable pilot operated needle valve arrangement including a floating needle valve 432, a pilot operated needle-valve-biasing piston 434, and a needle-valve-engaging adjustment mechanism 436.

A chamber 431 is formed in the front surface 236C of bypass body 236, and a hole 450 extends from chamber 431 to section 246 of passageway 238. Needle valve 432 includes a shaft 438 that extends through hole 450. Needle valve 432 includes a tip 440 shaped to sealingly engage seat 260. A ring 442 is located on the shaft 438 at the end opposite tip 440. A bias spring 444 is positioned on shaft 438 against ring 442 so that spring 444 biases a washer 446 and seal 448 against material on the inside of chamber 431 forming hole 450. Washer 446 is held in place by ears engaging slots in chamber 431 of body 236.

The inner half of chamber 431 adjacent hole 450 is smooth and forms a cylinder 452 for slideably receiving piston 434. Piston 434 includes an outer seal 454 for engaging cylinder 452, and further includes an inner pocket 456 for receiving ring 442 and the associated end of shaft 438. Two holes 460 and 462 lead to the inner and outer ends of cylinder 452 from upper surface 236A. Hole 462 communicates pilot air to one side of piston seal 454 for controlling the forward movement of piston 434, and in turn for controlling the forward movement of needle valve 432. Hole 460 is a breather vent for the forward piston cavity. The backward movement of the piston 434 is caused by bias spring 444. However, it is noted that alternative configurations are possible, such as wherein piston 434 is controllingly moved in both directions.

Adjustment mechanism 436 includes a nut 464 that attaches to the threaded outer half 466 of chamber 431, and covers the end of chamber 431. A threaded adjustment screw 468 extends threadably through a threaded hole 470 in the outer portion 465 of piston 434. Screw 468 includes an elongated hexagonal head 472 positioned outwardly of outer portion 465. A knob 474 is secured on the outer portion 465 of nut 464 by tabs 476. The face 478 of knob 474 includes a hex-shaped hole 480 that mateably engages hex head 472 on screw 468. Detent depressions 482 on the sidewall 484 of knob 474 frictionally engage ribs 486 on the outside of adjustment nut 464.

Needle valve 432 is shown normally open in FIG. 26 which allows full flow of lubricant during the suck-back cycle. Pilot air control lines are connected to ports 460 and 462. By selectively actuating ports 460 and 462, the tapered needle valve 432 is moved closer to the seat 260 during the dispense cycle. Rotation of the adjustment knob 474 clockwise will move the actuated "restrictive" position of the tapered needle 432 closer to the seat. Counterclockwise rotation of the adjusting knob will move actuator position of the tapered needle 260 farther from the seat 260.

Thus, there are provided fluid flow sensors for use in a remote location from a fluid delivery system. The fluid flow sensor includes a poppet that moves with fluid flow, a piston that moves correspondingly with the poppet, and a proximity switch actuated by movement of the piston, which arrangement provides a reliable and sensitive flow sensing arrangement which is readily adjustable. Changes and modifications in the specifically described embodiments can be carried out without departing from the principles of the invention. All such variations are encompassed within the invention which is intended to be limited only by the scope of the appended claims, as interpreted according to the principles of patent law, including the Doctrine of Equivalents.

The embodiments of the invention in which an exclusive property or privilege is claimed are defined as follows:

1. A method of detecting flow of a metered volumetric quantity of lubricant from a lubricant delivery system, comprising the steps of:

providing a body defining a lubricant conveying passageway, a poppet movably operably positioned in said passageway, a target associated with said poppet which moves in tandem with said poppet, and a proximity switch for sensing the position of said target; and adjusting said proximity switch relative to said target in a first direction and adjusting said target relative to said poppet in a second direction perpendicular to said first direction to achieve a desired actuation/de-actuation point of said proximity switch to thus provide a desired hysterisis of actuation/deactuation.

2. A device for sensing flow of a metered volumetric quantity of fluid from a fluid delivery system, comprising:

a body defining a fluid conveying passageway and a seat defined along said passageway, said passageway being operably connected to said fluid delivery system so that the fluid will flow through the passageway;

a poppet located in said passageway, said poppet being configured to operably engage said seat so that said poppet is normally engaged with said seat but is temporarily disengaged when a quantity of fluid is delivered from said fluid delivery system through said passageway;

a spring for biasing said poppet into engagement with said seat;

said poppet including a rod extending upstream of said poppet in said passageway, said body including material defining a lateral opening to said passageway, said rod including a remote end extending through said lateral opening; and a sensing mechanism engaged with said remote end of said rod extending through said lateral aperture, whereby said rod moves with said poppet and actuates said sensing mechanism as said poppet is moved, said sensing mechanism being operably connected to said fluid delivery system to indicate to the fluid delivery system that a quantity of fluid has been delivered.

3. A device as defined in claim 2 wherein said sensing mechanism includes a piston and a sensor for sensing the position of said piston.

4. A device as defined in claim 3 including a second bias spring for biasing said piston into engagement with said remote end of said rod.

5. A device as defined in claim 4 wherein said sensor includes a proximity switch.

6. A device as defined in claim 2 wherein said sensing mechanism includes a proximity switch.

7. A device as defined in claim 6 wherein said sensing mechanism includes a piston that engages said remote end of said rod, said piston being adjustable in a first direction relative to said poppet and said proximity switch being adjustable in a second direction perpendicular to said first direction, whereby the hysteresis of said sensing mechanism can be adjusted along with the sensitivity and actuation point of said sensing mechanism.

8. A device as defined in claim 2 including a component defining a bypass passageway communicating with said first passageway at locations located upstream and downstream of said seat, and including means for controlling fluid passing through said bypass passageway.

9. A device as defined in claim 8 wherein said means for controlling includes an adjustable restriction in said bypass passageway.

10. A device as defined in claim 9 wherein said means for controlling includes a pilot operated valve permitting suckback of fluid passing through said bypass passageway.

11. A device as defined in claim 9 wherein said means for controlling includes a valve configured to generate suckback of fluid when said valve is actuated.

12. A device for sensing flow of a metered volumetric quantity of fluid from a fluid delivery system, comprising:

a body defining a fluid conveying passageway;

a fluid flow responsive member operably positioned for movement in a first direction along said passageway;

a piston defining a target operably adjustably connected to said fluid flow responsive member for movement in response to movement of said fluid flow responsive member, said piston being generally axially aligned with said fluid flow responsive member and being movable along said first direction but being positioned remote from said fluid flow responsive member; and a proximity switch positioned in said body proximate said piston.

13. A device as defined in claim 12 wherein said proximity switch is adjustable in a second direction perpendicular to the first direction.

14. A device as defined in claim 12 wherein said fluid flow responsive member includes a rod that extends upstream in said fluid conveying passageway, and said piston abuttingly engages a free end of said rod.

15. A device for sensing flow of a metered volumetric quantity of lubricant from a lubricant delivery system, comprising:

a body defining a lubricant conveying passageway defining a longitudinal first direction and a seat defined along said passageway, said passageway being operably connected to said lubricant delivery system so that the lubricant will flow through the passageway;

a spring-biased poppet located in said passageway for reciprocating translating movement along the passageway, said poppet being configured to operably engage said seat and being normally engaged with said seat but being temporarily disengaged when a quantity of lubricant is delivered from said lubricant delivery system through said passageway, said poppet including a rod extending axially from said poppet; and sensing means including a target adjustably connected to said rod and movably positioned in said body but located remote from said poppet, said sensing means further including a proximity switch mounted on said body for sensing movement of said target, said proximity switch being adjustable in a second direction perpendicular to said first direction so that, by adjusting the target in the first direction and the proximity switch in the second direction, the hysterisis of actuation/deactuation and sensitivity of said proximity switch can be adjusted, said proximity switch being operably electrically connected to said lubricant delivery system so that movement of said poppet is signaled to said lubricant delivery system, whereby the device can be adjusted to sense flow of very small discontinuous amounts of lubricant that are delivered in rapid succession.

16. A device as defined in claim 15 wherein said sensing means includes a target operably connected to said poppet for simultaneous movement with said poppet when said poppet is moved, said proximity switch being located adjacent a path of movement defined by said target.

17. A device as defined in claim 16 wherein said target includes a piston operably connected to said poppet but not located in said passageway.

18. A device as defined in claim 15 wherein said proximity switch has a sensitivity and is positioned on said body to sense a movement of about 0.004 inches of said poppet.

19. A device as defined in claim 15 wherein said proximity switch is positioned so that the hysteresis in said proximity switch between actuating and de-actuating said proximity switch as said poppet is moved is less than about 0.004 inches.

20. A device as defined in claim 15 wherein said poppet is configured with clearances to operate in grease, and wherein said sensing means including said proximity switch are positioned in a location remote from said passageway and said grease.

21. A device as defined in claim 15 wherein said poppet and sensing means are adjustable to define an arrangement capable of measuring cycle speeds of about 100 milliseconds.

22. A device as defined in claim 15 wherein said poppet is configured to cycle from a delivered volumetric quantity of fluid of about 0.001 cubic inches per actuation.

23. A device as defined in claim 15 including a component defining a bypass passageway communicating with said first passageway at locations located upstream and downstream of said seat, and including means for controlling lubricant passing through said bypass passageway.

24. A device as defined in claim 23 wherein said means for controlling includes an adjustable restriction in said bypass passageway.

25. A device as defined in claim 23 wherein said means for controlling includes a pilot operated valve permitting suck-back of lubricant passing through said bypass passageway.

26. A device as defined in claim 23 wherein said means for controlling includes a valve configured to generate suck-back of lubricant when said valve is actuated.

27. A device for sensing flow of a metered volumetric quantity of fluid from a fluid delivery system, comprising:

a body defining a first fluid conveying passageway and a seat in the first passageway;

a fluid flow responsive member operably positioned for movement in said first passageway, said fluid flow responsive member being configured to sealingly engage said seat and being normally engaged therewith but being disengageable with said seat when fluid flows through the passageway;

a sensor for sensing movement of said fluid flow responsive member;

said body defining a second fluid conveying passageway operably connected to said first passageway that permits fluid to bypass said fluid flow responsive member; and means for restricting flow of fluid through said second passageway.

28. A device as defined in claim 27 wherein said means for restricting includes an adjustable restriction in said bypass passageway.

29. A device as defined in claim 27 wherein said means for restricting includes a pilot operated valve permitting suck-back of lubricant passing through said bypass passageway.

30. A device as defined in claim 27 wherein said means for restricting includes a valve configured to generate suck-back of lubricant when said valve is actuated.

31. A device for sensing flow of a metered volumetric quantity of lubricant from a lubricant delivery system, comprising:

a flow sensor body defining a lubricant conveying passage and a seat defined along said passageway, said passageway being operably connected to said lubricant delivery system so that the lubricant will flow through the passageway, said body including material defining a bend in said passageway and an aperture in said bend;

a poppet located in said passageway, said poppet being configured to operably engage said seat;

a first spring biasing said poppet into engagement with said seat so that said poppet is normally engaged with seat but is disengageable therefrom when a quantity of lubricant is delivered from said lubricant delivery system through said passageway;

said poppet including a rod extending upstream in said passageway and through said aperture in said bend, said rod including an end extending remote from said passageway;

an adjustment body attached to said flow sensor body, said adjustment body defining a generally aligned with said rod;

a piston slideably positioned in said bore;

a second spring biasing said piston into engagement with said end of said rod so that said piston moves with said poppet when said poppet is disengaged from said seat; and a proximity switch mounted to said adjustment body, said proximity switch including a sensing end positioned proximate said piston for sensing the movement of said piston, said proximity switch being operably connected to said lubricant delivery system.

32. A device as defined in claim 31 wherein said piston is adjustable relative to said poppet and said proximity switch is adjustable relative to said piston in a direction perpendicular to the longitudinal direction of said bore.

33. A device as defined in claim 31 including a component defining a bypass passageway communicating with said first passageway at locations located upstream and downstream of said seat, and including means for controlling lubricant passing through said bypass passageway.

* * * * *